United States Patent
Dyer

(10) Patent No.: US 6,666,015 B2
(45) Date of Patent: Dec. 23, 2003

(54) SIMPLIFIED FUEL CONTROL FOR USE WITH A POSITIVE DISPLACEMENT PUMP

(75) Inventor: Gerald P. Dyer, Enfield, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 0 days.

(21) Appl. No.: 10/058,510

(22) Filed: Jan. 28, 2002

(65) Prior Publication Data

US 2003/0140613 A1 Jul. 31, 2003

(51) Int. Cl.⁷ .............................. F02C 9/00; F02G 3/00
(52) U.S. Cl. .................................................. 60/39.281
(58) Field of Search ...................... 60/39.281; 417/307, 417/308, 295, 298; 137/15.13

(56) References Cited

U.S. PATENT DOCUMENTS

| | | | |
|---|---|---|---|
| 3,808,798 A | * 5/1974 | Taylor | ........................ 60/39.08 |
| 3,939,649 A | * 2/1976 | McCabe | .................. 60/39.281 |
| 4,033,112 A | 7/1977 | Schuster | |
| 4,245,468 A | * 1/1981 | Fondacci | ................. 60/39.281 |
| 4,411,133 A | 10/1983 | Stearns et al. | |
| 4,422,289 A | * 12/1983 | Langton | .................. 60/39.281 |
| 4,649,700 A | 3/1987 | Gardiner et al. | |
| 4,736,582 A | 4/1988 | Smith | |
| 4,751,942 A | 6/1988 | Dyer et al. | |
| 4,760,662 A | 8/1988 | Dyer et al. | |
| 4,971,005 A | 11/1990 | Dyer et al. | |
| 5,137,046 A | * 8/1992 | Sollman et al. | .......... 137/115.1 |
| 5,156,332 A | 10/1992 | Dyer | |
| 5,339,636 A | 8/1994 | Donnelly et al. | |
| 5,442,922 A | 8/1995 | Dyer et al. | |
| 5,448,882 A | * 9/1995 | Dyer et al. | .............. 60/39.281 |
| 5,715,674 A | * 2/1998 | Reuter et al. | ........... 60/39.281 |
| 5,845,484 A | * 12/1998 | Maker | ...................... 60/39.281 |
| 5,896,737 A | 4/1999 | Dyer | |
| 5,927,064 A | 7/1999 | Dyer et al. | |
| 6,065,451 A | 5/2000 | Lebrun | |
| 6,237,324 B1 | * 5/2001 | Smith | ....................... 60/39.281 |
| 6,250,067 B1 | 6/2001 | Dyer et al. | |
| 6,321,527 B1 | 11/2001 | Dyer et al. | |
| 6,401,446 B1 | * 6/2002 | Gibbons | .................. 60/39.281 |
| 6,526,743 B2 | * 3/2003 | Maker et al. | ............. 60/39.281 |
| 2002/0184884 A1 | * 12/2002 | McCarty | ....................... 60/773 |
| 2003/0046937 A1 | * 3/2003 | Mahoney et al. | .............. 60/773 |

FOREIGN PATENT DOCUMENTS

WO WO02/31332 4/2002

OTHER PUBLICATIONS

International Search Report Dated Jul. 4, 2003.

* cited by examiner

Primary Examiner—Cheryl J. Tyler
Assistant Examiner—William H. Rodriguez
(74) Attorney, Agent, or Firm—Carlson, Gaskey & Olds

(57) ABSTRACT

A fuel flow control system to control fuel by regulating fuel pressure includes an inlet, an outlet, and a bypass passage. A variable orifice valve controls the flow of fuel between the inlet and the outlet in conjunction with a fixed orifice of an engine such that the relationship between pressure and fuel flow is substantially linear. A pressure-regulating valve accommodates pressure fluctuations in the system. A dual torque motor opens in proportion to the level of applied electrical current to control fuel pressure and thereby fuel flow.

17 Claims, 3 Drawing Sheets

SIMPLIFIED FUEL CONTROL FOR USE WITH A POSITIVE DISPLACEMENT PUMP

BACKGROUND OF THE INVENTION

This invention relates to a fuel control system for a gas turbine engine and more particularly to a fuel control system for controlling fuel flow.

Typically, gas turbine engines use a positive displacement pump to pressurize fuel prior to metering and delivery. Positive displacement pumps provide fuel flow as a function of pump speed. Fluctuation in fuel pressure from the pump must be accommodated to properly and accurately control fuel flow to the engine. Fuel flow from the pump is delivered to a metering valve that controls a flow area to provide a desired fuel flow rate. Different pressures require different flow areas to provide the same fuel flow; therefore fluctuations in pressure across the metering valve must be accommodated.

Typically, a pressure-regulating valve is used to maintain constant pressure across the metering valve. The metering valve position is set by a separate valve or solenoid to provide the proper flow area and the pressure regulating valve maintains the proper pressure differential across the metering valve. In such systems fuel pressure is controlled separate of the flow area of the metering valve. The system operates by first setting the flow area and then setting the pressure in the system to a level relative to the flow area to provide a desired fuel flow rate. A change in the desired fuel flow rate requires an adjustment of the flow area.

Typically, an electronic engine control (EEC) regulates the valves in the fuel delivery system. Each valve controlled by the EEC adds to the complexity and weight of the system. Further, the more valves controlled by the EEC, the less reliable and consistent the control of fuel flow through the system.

For these reasons it is desirable to develop a simplified fuel delivery system that minimizes the number of valves and electronic devices, and maintains accurate and reliable control of fuel flow.

SUMMARY OF THE INVENTION

The invention is a fuel delivery system for controlling the flow of fuel to an engine assembly by controlling the fuel pressure of the system relative to an applied current.

The fuel delivery system of the subject invention includes a variable orifice valve acting in conjunction with fixed nozzles of the engine to control the flow of fuel to an engine in proportion to pressure within the system. The variable orifice valve varies a flow area to open proportionally in response to flow through the system. The variable flow area in concert with the fixed area of the engine nozzles creates a substantially linear relationship between system pressure and fuel flow to the engine. A positive displacement pump supplies fuel to the system. The fuel from the pump enters the system at a flow rate and pressure higher than required by the engine. The pressure in the system is set to obtain the desired fuel flow by bypassing a portion of fuel flow back to the pump.

A pressure-regulating valve accommodates fluctuations in pressure by proportionally opening and closing the flow of fuel through the bypass. A pressure setting valve controls the pressure-regulating valve by controlling the flow of fuel through a second bypass. An Electronic Engine Control (EEC) controls the amount of applied current to the pressure setting valve. The pressure setting valve opens the second bypass to fuel flow in proportion to an applied current such that the pressure is proportional to the current, and fuel flow is proportional to the pressure.

In this manner, the flow of fuel corresponds to the level of applied current to the pressure setting valve. The variable orifice valve opens to provide a flow area in proportion to the fuel flow such that the relationship of fuel pressure to fuel flow is substantially linear. Further, controlling current to the fuel setting valve controls pressure within the system which in turn controls fuel flow.

The system of the subject invention requires only the regulation of system pressure to control the fuel flow thereby providing a simplified, and cost effective device for controlling the flow of fuel to an engine accurately and reliably.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
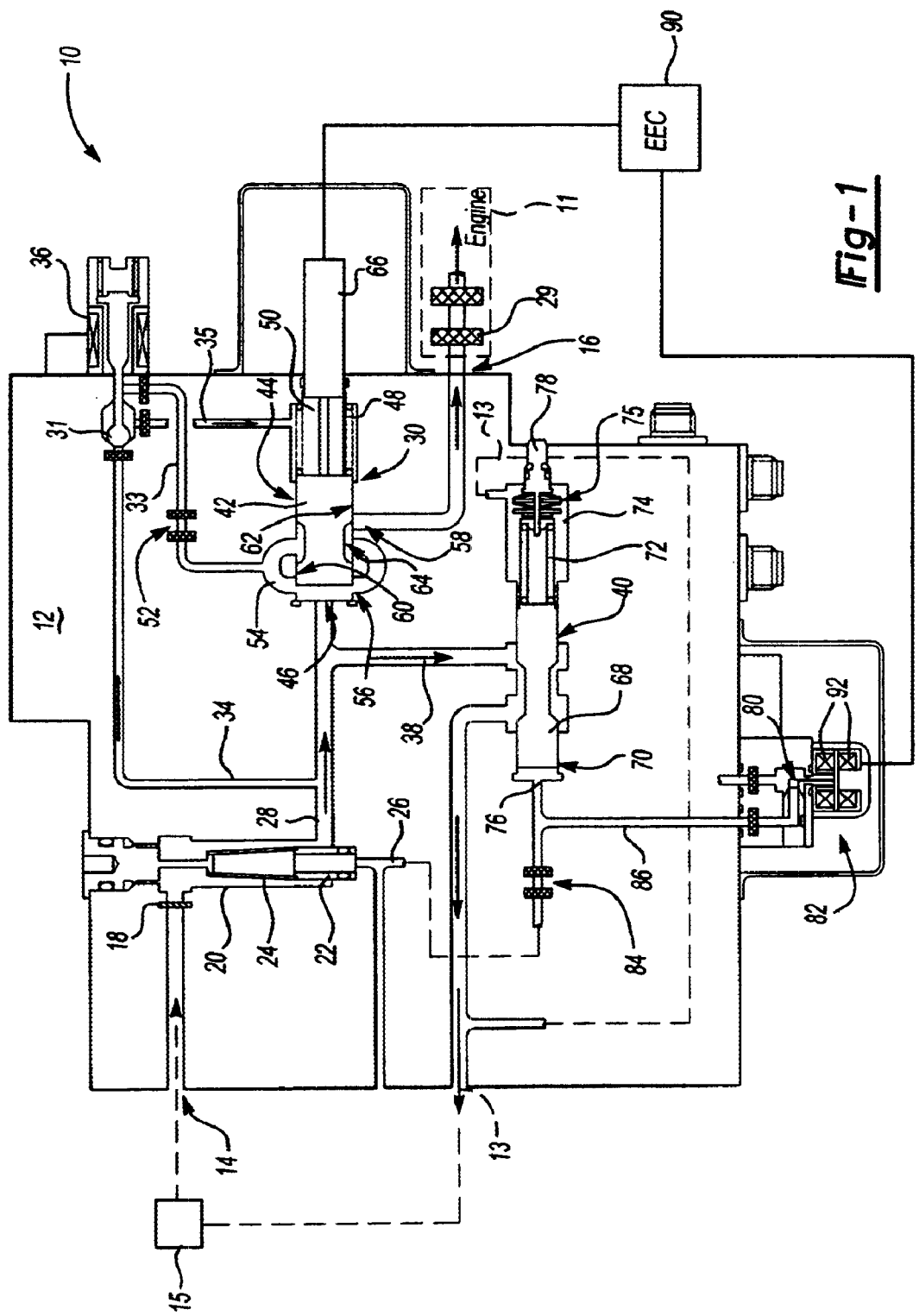
FIG. 1 is a schematic view of the fuel control system.

Referring to the Figures, wherein like numerals indicate like or corresponding parts throughout the several views, the subject invention is a fuel flow delivery system generally shown at 10 in FIG. 1. The system 10 includes a housing 12 defining an inlet 14, outlet 16 and a bypass 13. A pump 15 provides fuel flow at a pressure to the system 10. The pump 15 supplies fuel at a flow and pressure above the maximum output flow of the system 10. The system 10 controls the flow of fuel by varying the pressure level of the fuel. The system 10 regulates the pressure level by routing a portion of the fuel flow back to the pump 15 through the bypass 13.

A coarse filter 18 screens the fuel entering through the inlet 14 to prevent large objects from entering and damaging the system 10. Fuel than enters a filter chamber 20 including a filter assembly 22. The filter assembly 22 includes a fine mesh filter 24 to screen out small contaminants that may foul valves and orifices within the system 10. The fine mesh filter 24 is frustro-conical with the smaller diameter being upstream of fuel flow and the larger diameter downstream of fuel flow. The frustro-conical shape provides that contaminates are swept toward the large diameter to continuously flush the fine mesh filter 24 clean. The fuel filter assembly 22 is known to those skilled in the art, and substitution of fuel filter assemblies having different configurations is within the scope of this invention. The fuel chamber 20 includes two outlets 26,28, the first outlet 26 through the filter assembly 22 and the second outlet 28 around the filter assembly 22. Fuel flowing through the fine meshed filter 22 is routed to control valves, discussed below, and fuel routed around the filter assembly 22 flows to a variable orifice valve 30.

Fuel flow from the filter chamber to the variable orifice valve 30 branches off into a first passage 34 leading to a shut off valve 36 and a bypass 38 to a pressure-regulating valve 40. The variable orifice valve 30 operates in conjunction with engine nozzles of the engine 11. The engine nozzles are schematically represented as a single fixed orifice 29. The engine nozzles within the engine 11 may be of any type or number as known to a worker knowledgeable in the art.

Figure 5:
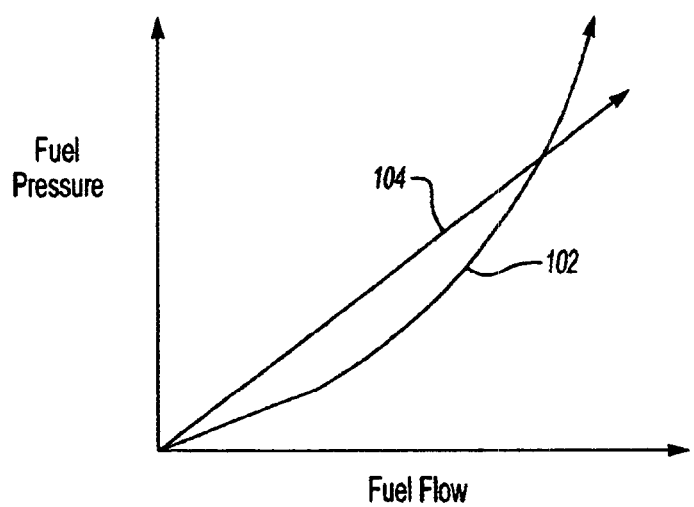
FIG. 5 is a graph representing the relationship between pressure and fuel flow.

Referring to the graph of FIG. 5, engine nozzles operate as fixed orifices, such that varying pressure through the fixed orifice 29 results in differing fuel flows. The non-linear line 102 generally indicates the relationship between fuel flow and pressure. The non-linear relationship between pressure and fuel flow is adjusted for by the inclusion of the variable orifice valve 30. The variable orifice valve 30 opens in proportion to fuel flow to provide a substantially linear relationship between fuel pressure and fuel flow as indicated at 104. The linear relationship allows the required control and calibration of pressure relative to fluid flow. Note that lines 102 and 104 are illustrations of the relationship between pressure and flow and a worker skilled in the are would understand that lines 102 and 104 are meant to be illustrative. The variable orifice valve 30 changes the flow area in proportion to pressure changes such that a change in the pressure increases or decreases the flow of fuel. Further, the variable orifice valve 30 accommodates minor fluctuations in pressure by proportionally opening or closing the variable orifice bypass 38 to maintain the linear relationship between fuel pressure and fuel flow.

Figure 2:
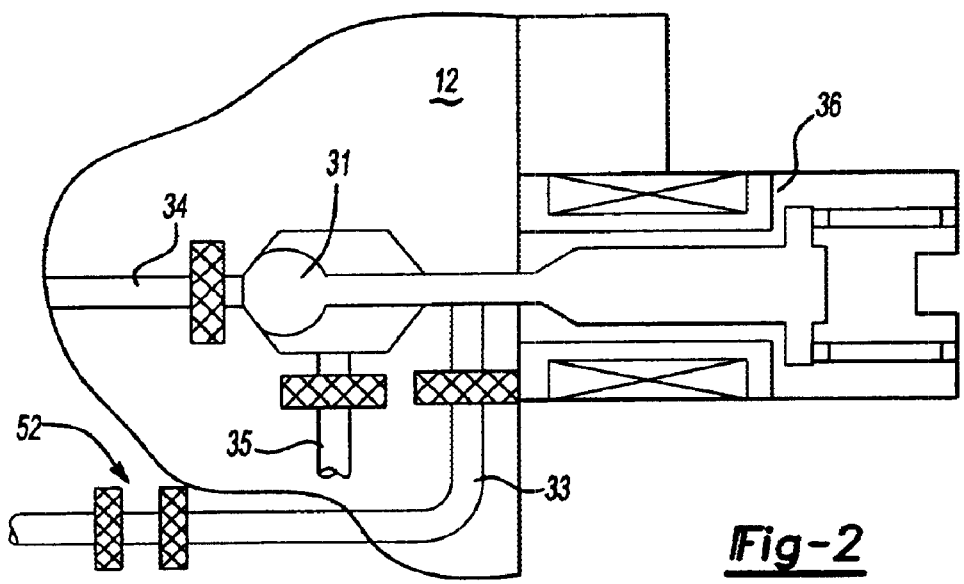
FIG. 2 is a schematic view of the shut off valve.
Figure 3:
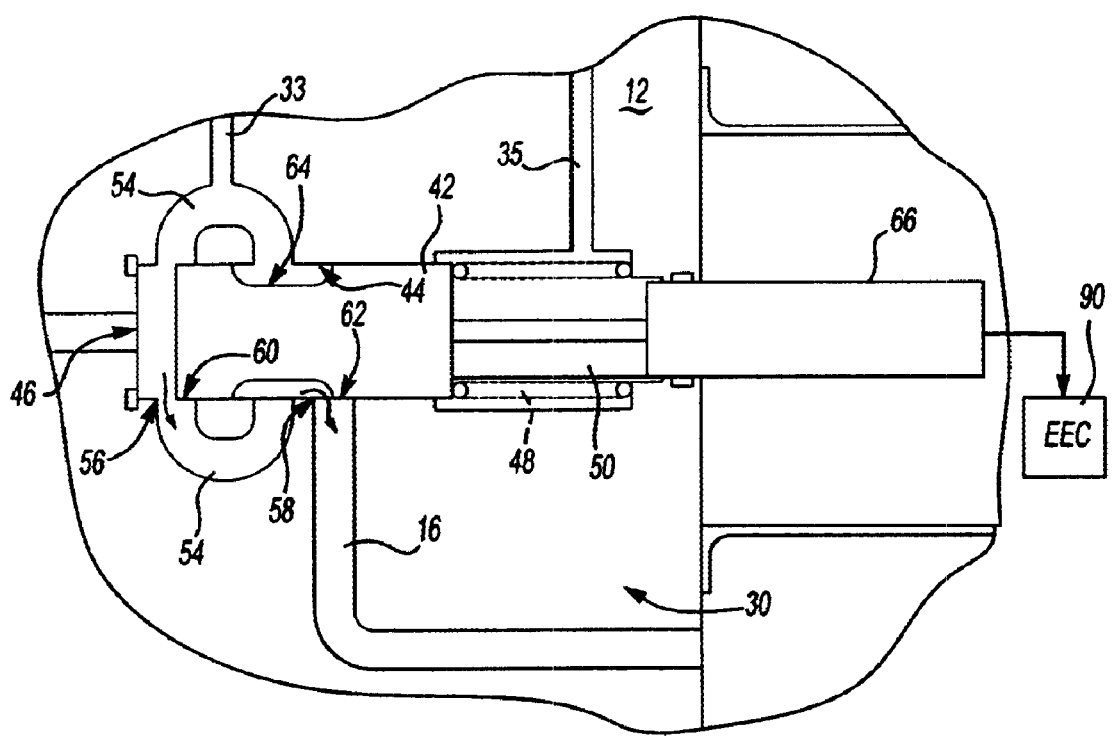
FIG. 3 is a schematic view of the variable orifice valve.

Referring to FIGS. 1–3, the variable orifice valve 30 includes a variable orifice spool 42 slidably disposed within a first bore 44. The first bore 44 includes an inlet passage 46 in fluid communication with the passage 28. The variable orifice spool 42 proportionally blocks the outlet 16 to control fuel flow. The variable orifice spool 42 is positioned within the variable orifice bore 44 to proportionally block the outlet 16 by balancing between incoming fuel pressure from a inlet 46 that biases the variable orifice spool 42 toward an open position and a spring 48 disposed within a spring chamber 50. In addition, the spring chamber 50 is in fluid communication with the shutoff valve 36 and thereby fuel pressure from the passage 28. Fuel pressure from the passage 28 is communicated to the spring chamber 50 by way of the shut off valve 36 through passage 35. Incoming fuel flow enters the shut off valve 36 through passage 34 or passage 33, depending on the position of a plunger 31.

During normal operation, fuel pressure is communicated from the variable orifice bore 44 through the passage 33, fixed orifice 52, the shutoff valve 36 and passage 35 to the spring chamber 50 of the variable orifice valve 30. Fuel pressure communicated through the fixed orifice 52 is at a lower pressure than fuel from the inlet 46. The fixed orifice 52 provides damping for the variable orifice spool 42. The fluid pressure communicated to the spring chamber 50 along with the spring 48, balances the variable orifice spool 42 against fuel pressure through the inlet 46.

To close the variable orifice spool 42 and thereby shut off the flow of fuel to the outlet 16, the plunger 31 of the shutoff valve 36 is actuated to open the passage 34 and to close the passage 33. With the plunger 31 in this position, passage 34 is in fluid communication with passage 35. In this way the fuel pressure communicated to the spring chamber 50 is substantially the same as the fuel pressure from the inlet 46 acting to open the variable orifice spool 42. Since these pressure are the same, the spring 48 creates a closing force greater than the force created by fuel pressure at the inlet 46 to close the variable orifice spool 42.

Referring to FIGS. 1 and 3, the variable orifice bore 44 includes a passage 54 routing the flow of fluid out of the variable orifice bore 44 and then back into the variable orifice bore 44. Fuel flow exits the variable orifice bore 44 into the passage 54 through a first flow area known in the art as a window 56. The variable orifice spool 42 includes first and second lands 60,62 and an annular recess 64 disposed therebetween. The first land 60 of the variable orifice spool 42 proportionally blocks the first window 56. Fuel flow re-enters the variable orifice bore 44 at a point corresponding to the variable orifice spool recess 64 to provide unrestricted fuel flow re-entering the variable orifice bore 44. The second land 62 forms a second window 58 that proportionally blocks the outlet 16. The areas of the first and second windows 56,58 vary with the position of the variable orifice spool 42. The first window 56 creates a pressure drop from inlet 46 to passage 54. The downstream pressure is ported to the spring chamber 50 through passage 33 and passage 35. The force resulting from the difference between the upstream and downstream pressure acting on the variable orifice spool 42 is balanced by the force of spring 48.

The second window 58 creates a pressure drop in the variable orifice valve 30 between fuel entering the variable orifice bore 44 at the meter inlet 46 and the fuel exiting through the outlet 16. The second window 58 is sized relative to the first window 56 to create a specific pressure drop. The size of the first and second windows 56,58, and thereby the specific pressure drop is tailored to the system 10 to improve the correlation between an input into the system and the fuel flow output to the engine. The system 10 meters fuel flow to the engine (not shown) through the fixed orifice 29. Without the pressure drop created by the second window 58 the correlation between fuel pressure and fuel flow is non-linear and therefore does not provide consistent fuel flow for a given fuel pressure. The size and shape of the second window 58 in concert with the fixed orifice 29 of the engine combine to improve the correlation between fuel pressure input into the system 10 and fuel flow output from the system 10 to provide a substantially linear relationship between fuel pressure and fuel flow.

Preferably the input to set the magnitude of fuel flow is by way of an applied current to a proportional valve. The proportional valve in this embodiment is a dual torque motor 82 that controls the opening of a flapper valve 80. Operation of the flapper valve 80 will be discussed further below. It should be understood that it is within the contemplation of this invention to use other types of proportional valves as are known to a worker skilled in the art.

The variable orifice valve 30 includes a Linear Variable Displacement Transducer 66 (LVDT) to sense the weight flow of fuel through the variable orifice valve 30. The LVDT 66 monitors the position of the variable orifice spool 42 relative to the variable orifice bore 44. The weight flow of fuel is measured as follows. When a quantity of fuel passes through the variable orifice bore 44, the variable orifice spool 42 moves to a balanced position relative to the variable orifice bore 44. The balanced position of the variable orifice spool 42 proportionally opens the first and second windows 56,58 until the pressure drop across the window 56 is equal to the force of the spring 48. The LVDT 66 senses the position of the variable orifice spool 42 and sends that information to an electronic engine control unit (EEC) 90. The EEC 90 is of any type known to one skilled in the art. The EEC 90 uses the variable orifice spool position to determined the weight flow of fuel by the equation:

$$Wf = KA\sqrt{deltaP}$$

Where Wf is the weight flow of fuel, K is a constant, A is the area of the window 56 and delta P is the pressure differential across the window 56. If the window 56 is rectangular, the area would be determined by the equation:

$$A = W*X$$

and delta P is:

$$\text{delta } P = \frac{Fo + KsX}{Av}$$

Where W is the width of the window 56, X is equal to the displacement of the variable orifice spool 42, and thereby the height of the window 56. Fo is the spring 48 preload force, Ks is the spring rate, and Av is the closed face area of the variable orifice spool 42. Closed face area is the area of the variable orifice spool 42 acted on by the fuel pressure from the meter inlet 46. It is well known that the window area of other shapes may also be determined as a function of the displacement of the variable orifice spool 42. The delta P is equal to the force of the spring 48 over the closed face area of the variable orifice spool 42 acted upon by the fuel pressure through the inlet. Substituting for A and delta P provides a final equation for determining weight flow of fuel.

$$Wf = KF(WX)\sqrt{\frac{Fo + KsX}{Av}}$$

The displacement of the variable orifice spool 42 is the only variable in this equation enabling the determination of the weight flow of fuel. It should be understood that other configurations of the variable orifice valve 30 may require modification of these equations, and such modifications are within the contemplation of this invention. As appreciated, it is within the contemplation of this invention that the flow windows may be of any shape known to one skilled in the art. Further, a worker skilled in the art would recognize that different configurations of the variable orifice valve 30 as are known to one skilled in the art are within the scope of this invention.

Figure 4:
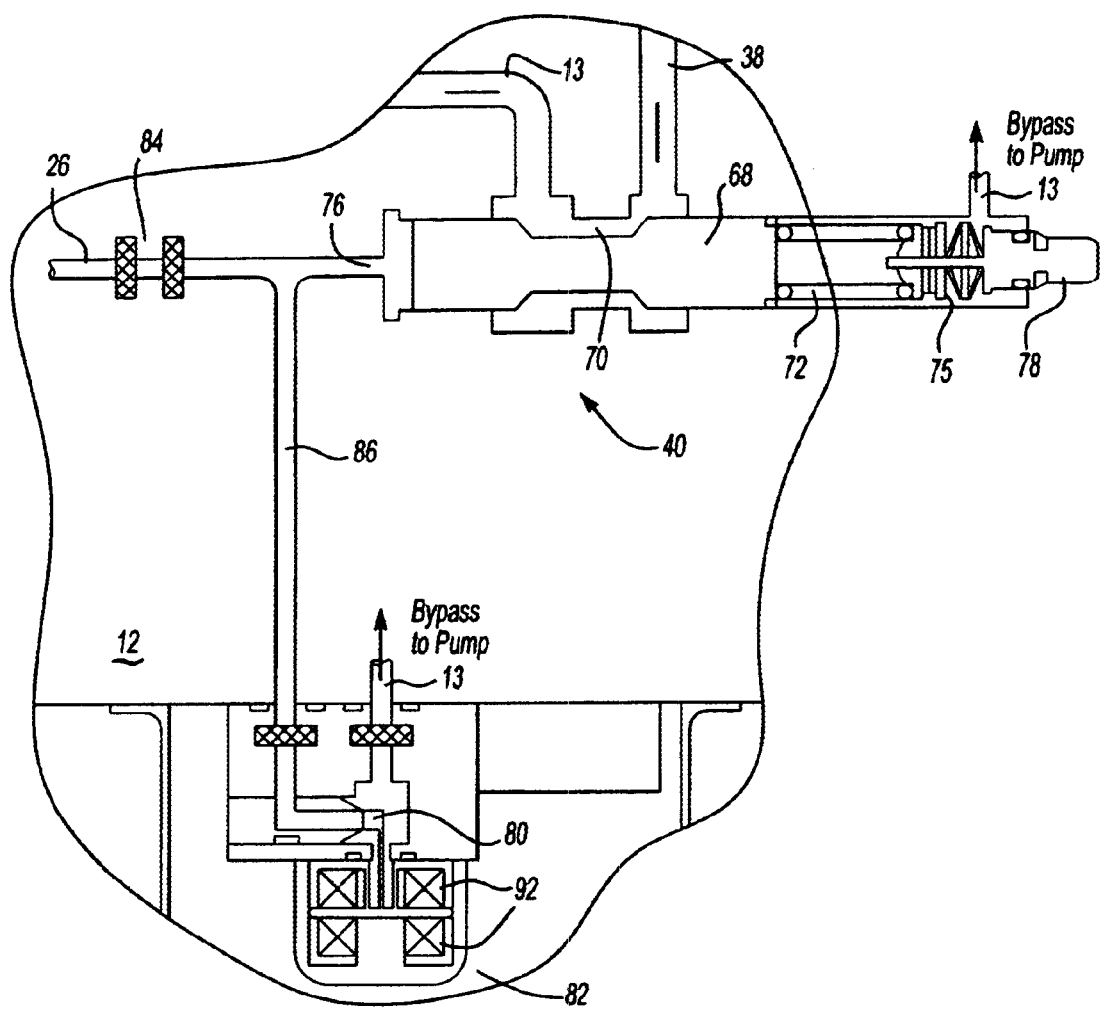
FIG. 4 is a schematic view of the pressure regulator valve and the dual torque motor.

Referring to FIGS. 1 and 4, the pressure-regulating valve 40 accommodates pressure fluctuations across the variable orifice valve 30 by controlling fuel flow through the variable orifice bypass 38. The pressure-regulating valve 40 includes a regulating spool 68 slidably disposed within a regulating bore 70. The regulating spool 68 proportionally blocks the flow of fuel from the variable orifice bypass 38 through the regulating bore 70 relative to a differential fuel pressure across the pressure-regulating valve 40. A spring 72 biases the regulating spool 68 toward a closed position. The spring 72 is contained within the spring chamber 74, and the spring chamber 74 is in fluid communication with the bypass 13. The position of the regulating spool 68 within the regulating bore 70 is determined by a balance between fuel pressure communicated to the spring chamber 74 and the spring 72 biasing the regulating spool 68 toward a closed position and fuel pressure at a regulator inlet 76 to push the regulating spool 68 to a fully open position. In this manner the pressure difference between regulator inlet 76 and spring chamber 74 (and thereby bypass 13) s held relatively constant by the pressure regulator valve 40.

The spring 72 is seated on bimetallic discs 75 that expand with an increase in temperature to compensate for fluctuations in fuel temperature. The bimetallic discs 75 accommodate temperature changes such that the pressure differential controlled by the pressure-regulating valve 30 is independent of fuel temperature. Preferably, bimetallic discs 75 are used to compensate for temperature, however, any type of temperature compensating assembly as is known by a worker skilled in the art is within the scope of this invention. An adjusting screw 78 provides for the calibration of the pressure-regulating valve 30 by adjusting the preload of the spring 72.

A backpressure, defined as the pressure difference between inlet 14 and bypass 13, in the system 10 is controlled by the flapper valve 80 of the dual torque motor 82 in concert with a fixed orifice 84. Fuel pressure from the filter chamber 20 is communicated to the regulating spool 68 across the fixed orifice 84. The fixed orifice 84 creates a predetermined pressure drop between the filter chamber 20 and the fixed orifice 84 as a function of flow. The dual torque motor 82 controls fuel flow and thereby pressure across the fixed orifice 84 by opening the flapper valve 80 in proportion to an applied current from the EEC 90. Since the pressure regulator valve 40 maintains a relatively constant pressure drop from regulator inlet 76 and bypass 13, the pressure difference between inlet 14 and bypass 13 is the sum of the pressure drop across the fixed orifice 84 and the value of the pressure drop maintained by the pressure regulator valve 40.

The dual torque motor includes dual coils 92 that pivot the flapper valve 80 between open and closed positions. Opening of the flapper valve 80 allows flow through the regulator bypass 86 to the bypass 13 and the pump 15, thereby reducing the fluid pressure at the regulator inlet 76 acting on the regulating spool 68, which in turn causes the regulating spool 68 to move toward the closed position. Conversely, closing the flapper valve 80 closes the flow of fuel through the regulator bypass 86, thereby increasing fuel pressure at the regulator inlet 76, which in turn causes the regulating spool 68 to move toward the fully open position. The EEC 90 controls the applied current to the dual torque motor 82 to set a desired fuel flow through the outlet 16 to the engine.

In operation fuel flow is regulated as a function of the applied current to the dual torque motor 82. The dual torque motor 82 opens the flapper valve 80 an amount proportional to the applied current to set fuel flow through the regulator bypass 86 to the pump 15 which sets the backpressure for the system 10. Once the desired backpressure in the system 10 is set by setting fuel flow through the regulator bypass 86, the regulating spool 68 moves to a balanced position relative to the pressure differential. The variable orifice valve 30 opens in proportion to backpressure in the system by opening the variable orifice spool 42 to vary the flow area in conjunction with the fixed orifice 29 to obtain the desired fuel flow rate to the engine.

The system 10 transitions from one fuel flow rate to another fuel flow rate by changing the level of applied current to the dual torque motor 82. Movement from one fuel flow rate to higher fuel flow rate occurs by first applying a current to the coils 92 of the dual torque motor 82 at a predetermined level to provide the desired fuel flow rate and backpressure. The change in current causes the flapper valve 80 to open an amount proportional to the current to allow a proportionate change in flow through the regulator bypass 86 and a proportional change in backpressure. An increase in flow through the regulator bypass 86 decreases the fluid pressure at the regulator inlet 76 which in turn causes the regulating spool 68 to proportionally close off flow through the variable orifice bypass 38. The decrease in flow through the variable orifice bypass 38 causes a corresponding increase in flow through the variable orifice valve 30 since the output of 15 is constant. This increase in flow causes an increase in differential fuel pressure across the variable orifice valve 30 such that the variable orifice spool moves toward the open position to allow additional flow through the outlet 16 to the engine. The resulting higher backpressure is reflected to regulator bypass 86 to restore the force balance on the regulator spool 68.

Once the system 10 has been set at a desired fuel flow rate, pressure fluctuations may be encountered by the system 10 due to the cyclical nature of the pump 15 feeding fuel to the system 10. The system 10 compensates for fluctuation in fuel pressure to provide a constant fuel flow to the engine. In the event that the fuel pressure from the inlet 14 increases the regulating spool 68 will be forced open an amount proportional to the pressure increase to allow a greater amount of fuel flow through the variable orifice bypass 38 and away from the variable orifice spool 42, thereby maintaining the pressure differential across the variable orifice valve 30 and maintaining the desired fuel flow. Conversely a decrease in fluid pressure will cause the regulating spool 68 to close a proportionate amount, thereby increasing the fuel pressure to the variable orifice spool 42 to maintain the constant flow of fuel.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A fuel flow delivery system comprising;
   a pump for providing fuel flow at a pressure through an inlet;
   a fixed orifice through which fuel flows;
   a variable orifice operating in conjunction with said fixed orifice and including a flow area, said fuel flow area varying in proportion to fuel pressure such that a relationship between fuel flow and pressure is substantially linear;
   a pressure regulating valve in fluid communication with said variable orifice to control a pressure differential across said variable orifice;
   a pressure setting valve in fluid communication with said pressure regulating valve to adjust said pressure differential such that said fuel flow through said system is controlled by setting said pressure differential.

2. The system of claim 1, wherein said variable orifice includes a variable orifice spool slidably disposed within a bore, said variable orifice spool biased against said fuel pressure from said inlet.

3. The system of claim 2, wherein said bore includes a passage, said passage routes said flow of fuel out of said bore then back into said bore.

4. The system of claim 3, wherein said variable orifice spool includes first and second lands, an outlet and a recess, said first land proportionally blocking said passage to form a first flow area, said second land proportionally blocking said outlet to form a second flow area, and said fuel flow reentering said variable orifice bore at a point corresponding to said recess of said variable orifice spool.

5. The system of claim 4, wherein said first and second lands of said spool valve are positioned to size said second flow area relative to said first flow area to create a predetermined difference in pressure between said inlet and said outlet.

6. The system of claim 2, wherein said variable orifice valve includes a sensor for monitoring the flow of fuel through said outlet.

7. The system of claim 6, wherein said sensor is a linear variable displacement transducer attached to monitor variable orifice spool displacement.

8. The system of claim 6, wherein said bore includes a spring chamber disposed opposite said inlet, said spring chamber including a spring to bias said variable orifice spool toward a closed position.

9. The system of claim 1, further including a first bypass in fluid communication with said inlet, and said pressure regulating valve controls said pressure differential across said variable orifice by controlling the flow of fuel through said first bypass.

10. The system of claim 1, wherein said pressure regulating valve includes a regulating spool slidably disposed within a regulating bore, said regulating spool proportionally blocks the flow of fuel through a first bypass in proportion to fuel pressure at a regulator inlet.

11. The system of claim 1, wherein said pressure setting valve controls fuel pressure at a regulator inlet to control a position of a regulating spool.

12. The system of claim 11, wherein said pressure setting valve is a dual torque motor having a flapper valve, and said flapper valve opens in proportion to an amount of applied current to allow a flow of fuel away from said regulator inlet to control fuel pressure at said regulator inlet.

13. A fuel flow delivery system comprising;
    a pump for providing fuel flow at a pressure through an inlet;
    a fixed orifice through which fuel flows;
    a variable orifice operating in conjunction with said fixed orifice and including a flow area, an outlet and a passage, said flow area varying in proportion to fuel pressure such that a relationship between fuel flow and pressure is substantially linear, and said passage creating a pressure differential in fuel pressure between said inlet and said outlet;
    a pressure-regulating valve in fluid communication with said variable orifice valve to control said pressure differential;
    a pressure setting valve in fluid communication with said pressure regulating valve to adjust said pressure differential such that said flow fuel through said system is controlled by setting said pressure differential.

14. The system of claim 13, wherein said variable orifice includes a variable orifice spool slidably disposed within a bore, said variable orifice spool biased against said fuel pressure from said inlet.

15. The system of claim 14, wherein said bore includes said passage, said passage routes said flow of fuel out of said bore then back into said bore.

16. The system of claim 14, wherein said variable orifice spool includes first and second lands and a recess, said first land proportionally blocking said passage to form a first flow area, said second land proportionally blocking said outlet to form a second flow area, and said fuel flow reentering said variable orifice bore at a point corresponding to said recess of said variable orifice spool.

17. The system of claim 16, wherein said first and second lands of said spool valve are positioned to size said second flow area relative to said first flow area to create said drop in fuel pressure between said inlet and said outlet.

* * * * *